United States Patent
Zhao et al.

(10) Patent No.: US 8,588,762 B2
(45) Date of Patent: Nov. 19, 2013

(54) METHOD AND APPARATUS FOR PERFORMING CHANNEL MEASUREMENT FOR CELL

(75) Inventors: Yajun Zhao, Shenzhen (CN); Qiang Li, Beijing (CN); Xiaoan Fan, Beijing (CN); Lei Wan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/434,561

(22) Filed: Mar. 29, 2012

(65) Prior Publication Data

US 2012/0190356 A1 Jul. 26, 2012

Related U.S. Application Data (63) Continuation of application No. PCT/CN2010/077529, filed on Sep. 30, 2010.

(30) Foreign Application Priority Data

Sep. 30, 2009 (CN) .......................... 2009 1 0235323

(51) Int. Cl.
*H04W 4/00* (2009.01)

(52) U.S. Cl.
USPC ..... 455/422.1; 455/423; 455/450; 455/67.11; 370/328; 370/338

(58) Field of Classification Search
USPC ............. 455/422.1, 423, 67.11, 67.13, 67.14, 455/67.16; 370/328–338
See application file for complete search history.

(56) References Cited

U.S. PATENT DOCUMENTS

| | | | |
|---|---|---|---|
| 2005/0094596 A1 | 5/2005 | Pietraski et al. | |
| 2012/0122478 A1* | 5/2012 | Siomina et al. | 455/456.1 |

FOREIGN PATENT DOCUMENTS

| | | |
|---|---|---|
| CN | 1921463 A | 2/2007 |
| CN | 101064557 A | 10/2007 |
| CN | 101635950 A | 1/2010 |
| WO | WO 2008/084371 A2 | 7/2008 |
| WO | WO 2008/136614 A2 | 11/2008 |
| WO | WO 2011/017953 A1 | 2/2011 |

OTHER PUBLICATIONS

European Search Report received in European Application No. 10819924.1-1525, mailed Jul. 5, 2012, 7 pages.

Panasonic, "Downlink CSI-RS Design for Inter-Cell Scenarios," 3GPP TSG RAN WG1 Meeting #58, R1-093457, Shenzhen, China, Aug. 24-28, 2009, 2 pages.

International Search Report and translation received in Patent Cooperation Treaty Application No. PCT/CN2010/077529, mailed Jan. 6, 2011, 8 pages.

(Continued)

*Primary Examiner* — Chuong A Ngo
(74) *Attorney, Agent, or Firm* — Slater & Matsil, L.L.P.

(57) ABSTRACT

Embodiments of the present invention provide a method and an apparatus for performing channel measurement for a cell. The method includes: sending information about a location of a to-be-measured reference signal to a user equipment, where the location of the to-be-measured reference signal is a part of a location occupied by a reference signal of the cell; and receiving a channel measurement report of the cell. The channel measurement report is sent by the user equipment and is obtained after the user equipment performs channel measurement for the cell according to the information about the location of the to-be-measured reference signal.

13 Claims, 6 Drawing Sheets

(56) References Cited

OTHER PUBLICATIONS

Written Opinion of the International Searching Authority and translation received in Patent Cooperation Treaty Application No. PCT/CN2010/077529, mailed Jan. 6, 2011, 11 pages.

NEC Group, "On the role of Rel-8 cell-specific RS as CSI-RS for LTE-A," 3GPP TSG-RAN WG1 Meeting #57, R1-091686, San Francisco, USA, May 4-8, 2009, 5 pages.

First Chinese Office Action received in Chinese Application No. 200910235323.8 dated Oct. 31, 2012, 7 pages.

* cited by examiner

METHOD AND APPARATUS FOR PERFORMING CHANNEL MEASUREMENT FOR CELL

CROSS-REFERENCE TO RELATED APPLICATIONS

This application is a continuation of International Application No. PCT/CN2010/077529, filed on Sep. 30, 2010, which claims priority to Chinese Patent Application No. 200910235323.8, filed on Sep. 30, 2009, both of which are hereby incorporated by reference in their entireties.

FIELD OF THE INVENTION

The present invention relates to the field of communication technologies, and in particular, to a method and an apparatus for performing channel measurement for a cell.

BACKGROUND OF THE INVENTION

In a radio communication system, to schedule radio resources effectively and efficiently, the network device needs to obtain enough downlink channel state information that has certain accuracy. To make the network device obtain the downlink channel state information, the mobile station needs to measure and report such information.

The method for the mobile station to measure and report includes the following. The network device sends a certain reference signal for measuring the downlink channel to the mobile station in the coverage area; after receiving the reference signal, the mobile station obtains a downlink channel response through measurement and calculation, and obtains the channel state information according to the downlink channel response. Afterward, the mobile station properly quantizes the downlink channel state information according to a certain rule, and feeds back the downlink channel state information to the corresponding network device.

The CoMP (Coordinated multipoint processing, coordinated multipoint processing) multi-cell downlink channel estimation technology is introduced to achieve higher user throughput. In a CoMP scenario, multiple cells provide data transmission services for a same UE (User Equipment, user equipment) simultaneously. What is different from a traditional single-cell service is that, in a CoMP scenario, the UE needs to measure reference signals delivered by multiple serving base stations simultaneously, and estimate the downlink channel information from multiple base stations and feed back the information.

Figure 1:
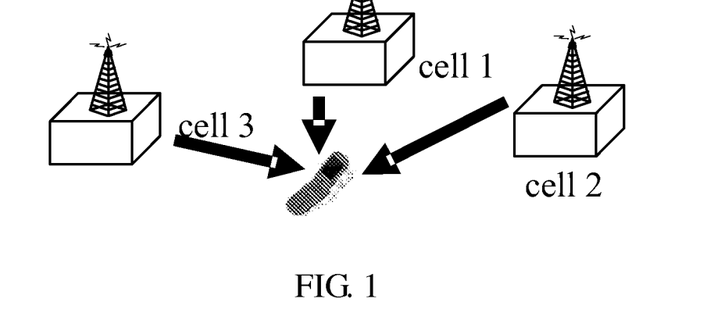
FIG. 1 is a schematic structural diagram of a radio transmission system in a CoMP scenario in the prior art.

A method for measuring channel state information in the prior art is: The network device delivers a CRS (common reference signal, common reference signal) to the UE, and the UE estimates the downlink channel according to the CRS. The CRS may be used for data coherence demodulation and channel measurement at the same time. Taking the radio transmission system shown in FIG. 1 as an example, this system includes cells (cell) 1, 2 and 3 and UE1. Cell 1 is a serving cell of the UE, and cells 1, 2, and 3 make up a CoMP measurement set of UE1. By detecting all downlink CRSs from each cell, UE1 obtains the downlink channel state information of each cell. UE1 measures the RE (Resource element, resource element) occupied by all CRSs at each subframe to obtain the downlink channel state information of each cell. Afterward, UE1 feeds back the obtained downlink channel information of each cell to each cell respectively.

In practical applications, the CRS may be replaced with CSI-RS (CSI-RS Channel State Information Reference signal, channel state information reference signal). The period of the CRS is different from the period of the CSI-RS, and the density of the occupied REs also varies between the CRS and the CSI-RS. The density of the RE refers to the number of REs on each RB (resource block, resource block) of each subframe from which the reference signals CRS and CSI-RS are sent, namely, number of REs occupied by the reference signals on each RB of the subframe.

In the process of implementing the present invention, the inventor finds at least the following problems in the prior art: When the UE performs channel measurement for each cell, the UE measures the REs occupied by all reference signals on each subframe, which leads to great workload of the UE in the channel measurement.

SUMMARY OF THE INVENTION

An embodiment of the present invention provides a method and an apparatus for performing channel measurement for a cell to reduce workload of a UE in channel measurement.

A method for performing channel measurement for a cell includes:

sending information about a location of a to-be-measured reference signal to a user equipment, where the location of the to-be-measured reference signal is a part of a location occupied by a reference signal of the cell; and receiving a channel measurement report of the cell, where the channel measurement report is sent by the user equipment and is obtained after the user equipment performs channel measurement for the cell according to the information about the location of the to-be-measured reference signal.

A method for performing channel measurement for a cell includes:

receiving information about a location of a to-be-measured reference signal of the cell, where the information about the location of the to-be-measured reference signal is sent by a network side and is about a part of a location occupied by a reference signal of the cell; and performing channel measurement for the cell according to the information about the location of the to-be-measured reference signal, and returning a channel measurement report to the network side.

An apparatus for performing channel measurement for a cell includes:

an information sending module, configured to send information about a location of a to-be-measured reference signal to a user equipment, where the information about the location of the to-be-measured reference signal is about a part of a location occupied by a reference signal of the cell; and a channel measurement report receiving module, configured to receive a channel measurement report of the cell, where the channel measurement report is sent by the user equipment and is obtained after the user equipment performs channel measurement for the cell according to the information about the location of the to-be-measured reference signal.

An apparatus for performing channel measurement for a cell includes:

an information receiving module, configured to receive information about a location of a to-be-measured reference signal of the cell, where the information about the location of the to-be-measured reference signal is sent by a network side and is about a part of a location occupied by a reference signal of the cell; and a measurement processing module, configured to perform channel measurement for the cell according to the information about the location of the to-be-measured reference signal, and return a channel measurement report to the network side.

It can be seen from the technical solution provided in the embodiments of the present invention that: the information about the location of the to-be-measured reference signal is sent to the user equipment, where the location of the to-be-measured reference signal is a part of the location occupied by the reference signal of the cell, so that the UE performs channel measurement based on the density of a part of REs occupied by the reference signal, which reduces the workload of the UE in channel measurement.

BRIEF DESCRIPTION OF THE DRAWINGS

To describe the technical solution of the present invention more clearly, the accompanying drawings to be used in description of the embodiments of the present invention is introduced briefly in the following. Apparently, the accompanying drawings to be described in the following are only some embodiments of the present invention, and persons of ordinary skill in the art can derive other drawings according to these drawings without making any creative effort.

DETAILED DESCRIPTION OF THE EMBODIMENTS

In an embodiment of the present invention, a network side sends information about a location of a to-be-measured reference signal to a user equipment, where the location of the to-be-measured reference signal is a part of a location occupied by a reference signal of a cell. Afterward, the network side receives a channel measurement report of the cell, where the channel measurement report is sent by the user equipment and is obtained after the user equipment performs channel measurement for the cell according to the information about the location of the to-be-measured reference signal.

Further, the information about the location of the to-be-measured reference signal includes: a measurement period of the user equipment performing channel measurement, and RE locations occupied by the reference signal in the measurement period, where the measurement period is greater than the sending period of the reference signal; or a measurement period of the user equipment performing channel measurement, and a part of the RE locations occupied by the reference signal in the measurement period; or a measurement period of the user equipment performing channel measurement, and a part of RE locations occupied by the reference signal in the measurement period, where the measurement period is greater than the sending period of the reference signal.

Further, the measurement period is an integer multiple of the sending period of the reference signal.

Further, when multiple cells use one type of reference signal, a unified measurement period of the multiple cells is an integer multiple of the sending period of this type of reference signal; and/or the density of the REs occupied by the reference signal to be measured in the unified measurement period of the multiple cells is less than or equal to the density of the REs occupied by this type of reference signal; and When multiple cells are configured to use multiple types of reference signals, a unified measurement period of the multiple cells is an integer multiple of the sending period of a specified type of reference signal among the multiple types of reference signals; and/or the density of the REs occupied by the reference signals to be measured in the unified measurement period of the multiple cells is less than or equal to the density of the REs occupied by the specified type of reference signal among the multiple types of reference signals.

Further, a puncturing period and puncturing locations are configured for puncturing at neighboring cell RE locations corresponding to the reference signals, where the puncturing locations are neighboring cell RE locations corresponding to the RE locations occupied by the reference signals in the puncturing period, and the puncturing period is greater than the sending period of the reference signals; or a puncturing period and puncturing locations are configured for puncturing at neighboring cell RE locations corresponding to the reference signals, where the puncturing locations are neighboring cell RE locations corresponding to a part of the RE locations occupied by the reference signals in the puncturing period; or a puncturing period and puncturing locations are configured for puncturing at neighboring cell RE locations corresponding to the reference signals, where the puncturing locations are neighboring cell RE locations corresponding to a part of the RE locations occupied by the reference signals in the puncturing period, and the puncturing period is greater than the sending period of the reference signals.

Further, when multiple cells use one type of reference signal, a unified puncturing period of the multiple cells is an integer multiple of the sending period of this type of reference signal; and/or, a unified puncturing density of the multiple cells is less than or equal to the density of the REs occupied by this type of reference signal.

When multiple cells use multiple types of reference signals, a unified puncturing period of the multiple cells is an integer multiple of the sending period of a specified type of reference signal among the multiple types of reference signals; and/or, a unified puncturing density of the multiple cells is less than or equal to the density of the REs occupied by the specified type of reference signal among the multiple types of reference signals.

Further, at least one of the following items is sent to the user equipment: the time of measurement performed by the user equipment in each cell and the time of measurement performed by the user equipment on different antenna ports of a same cell.

Further, an identifier of each cell is used to identify at least one of the following items: the measurement period of the channel measurement performed by the user equipment, the information about the location of the to-be-measured reference signal, the time of measurement performed by the user equipment in each cell, and the time of measurement performed by the user equipment on different antenna ports of a same cell.

To facilitate the understanding of the embodiments of the present invention, several embodiments of the present invention are used as examples in the following with reference to accompanying drawings for further explanation and illustration. These embodiments shall not be construed as limitations on the present invention.

Embodiment 1

Figure 2:
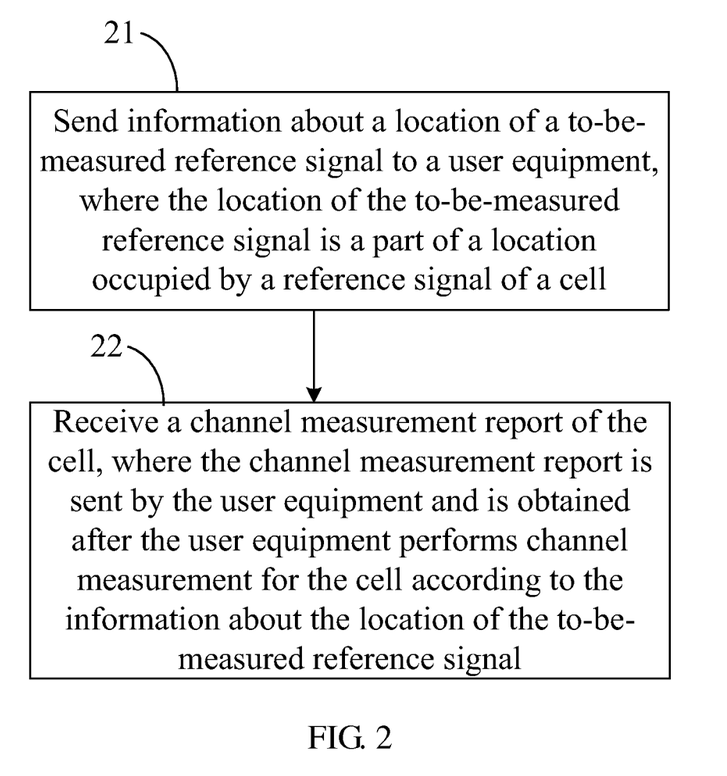
FIG. 2 is a flowchart of a method for performing channel measurement for a cell according to Embodiment 1 of the present invention.

This embodiment provides a method for performing channel measurement for a cell. The method, the processing procedure of which is as shown in FIG. 2, includes the following steps:

Step 21: Send information about a location of a to-be-measured reference signal to a user equipment, where the location of the to-be-measured reference signal is a part of a location occupied by a reference signal of the cell.

The information about the location of the to-be-measured reference signal includes: a measurement period of the user equipment performing channel measurement, and RE locations occupied by the reference signal in the measurement period, where the measurement period is greater than a sending period of the reference signal; or, a measurement period of the user equipment performing channel measurement, and a part of the RE locations occupied by the reference signal in the measurement period; or, a measurement period of the user equipment performing channel measurement, and a part of RE locations occupied by the reference signal in the measurement period, where the measurement period is greater than the sending period of the reference signal.

Step 22: Receive a channel measurement report of the cell, where the channel measurement report is sent by the user equipment and is obtained after the user equipment performs channel measurement for the cell according to the information about the location of the to-be-measured reference signal.

Embodiment 2

In this embodiment, a unified channel measurement mechanism adopted by a UE in each cell can be configured, no matter whether the reference signal for each cell is a CSI-RS or a CRS.

Figure 3:
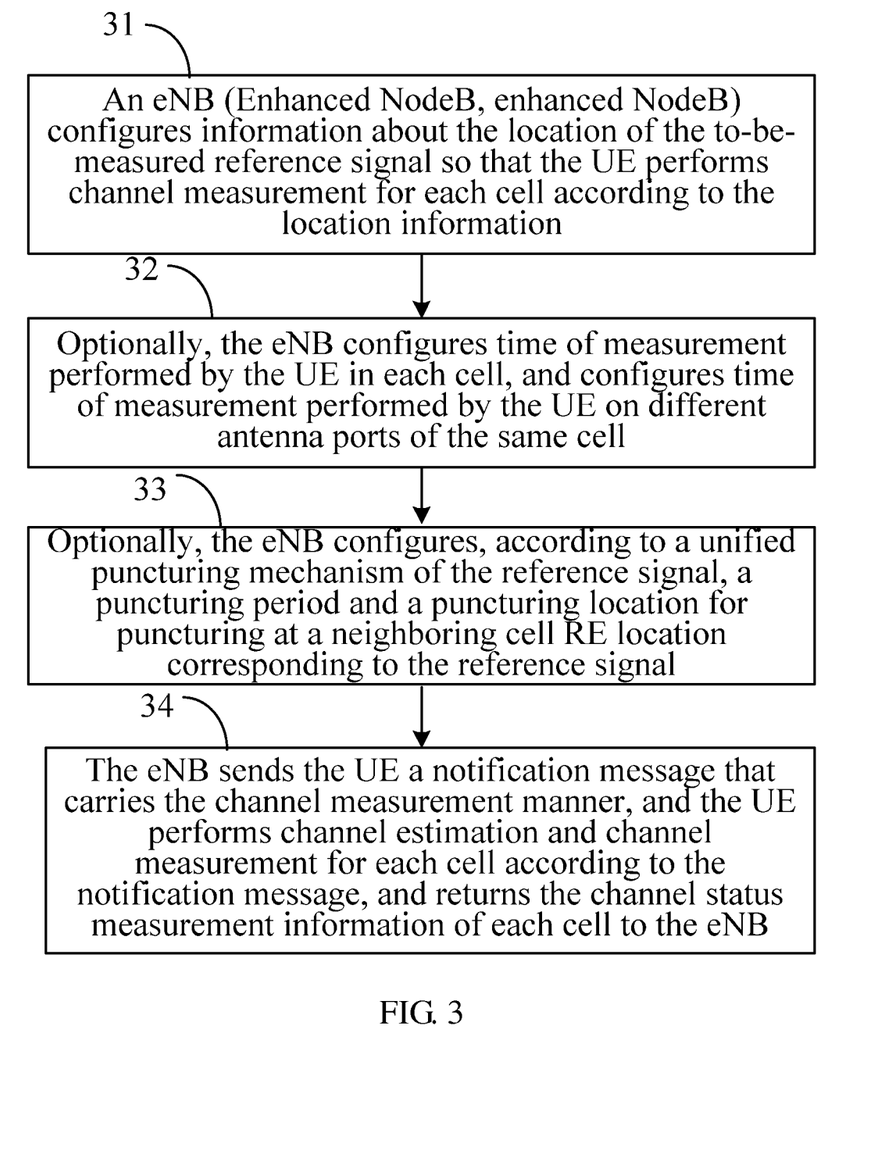
FIG. 3 is a flowchart of a method for performing channel measurement for a cell according to Embodiment 2 of the present invention.

This embodiment provides a method for performing channel measurement for a cell. The method, the processing procedure of which is as shown in FIG. 3, includes the following steps:

Step 31: An eNB (Enhanced NodeB, enhanced NodeB) configures information about a location of a to-be-measured reference signal so that the UE performs channel measurement for each cell according to the location information.

The eNB configures the information about the location of the to-be-measured reference signal, no matter whether the to-be-measured reference signal for measuring the channel state information is a CSI-RS or a CRS. Afterward, the location information is sent to the UE so that the UE performs channel measurement for each cell according to the location information.

The eNB may be a base station that performs unified management for each cell in the CoMP scenario.

The information about the location of the to-be-measured reference signal includes: a measurement period of the user equipment performing channel measurement, and RE locations occupied by the reference signal in the measurement period, where the measurement period is greater than the sending period of the reference signal; or, a measurement period of the user equipment performing channel measurement, and a part of the RE locations occupied by the reference signal in the measurement period; or, a measurement period of the user equipment performing channel measurement, and a part of RE locations occupied by the reference signal in the measurement period, where the measurement period is greater than the sending period of the reference signal.

The UE does not perform channel measurement on every subframe from which the reference signal is sent, or on every RE occupied by the reference signal.

For example, when the reference signal is a CRS, the UE performs channel measurement by detecting data on only a part of REs occupied by the CRS rather than data on all REs occupied by the CRS.

The eNB may use the following methods, but without being limited to the following methods, to configure the measurement period of the UE performing channel measurement:

1. Configure the measurement period according to the sending period of the CRS or CSI-RS configured in the LTE (Long Term Evolution, Long Term Evolution)-A system. The configured measurement period may be an integer multiple of the sending period of the CRS or CSI-RS (for example, one of the period, twice of the period, and so on).

When different cells in a CoMP set use one type of reference signal (CSI-RS or CRS), the configured measurement period may be an integer multiple of the sending period of this type of reference signal; and when different cells in a CoMP set use different reference signals (CSI-RS and CRS), because the sending period of the CSI-RS is longer than that of the CRS, the configured measurement period may be an integer multiple of the sending period of the CSI-RS.

2. According to practical conditions (transmitting mode, cell load, and channel environment), configure the measurement period of the UE performing channel measurement.

3. Configure the measurement period to be equal to a puncturing period of the CRS or CSI-RS. For the detailed puncturing method of the CRS or CSI-RS, see embodiment 2.

Optionally, in step 32, the eNB configures the time of measurement performed by the UE in each cell, and configures the time of measurement performed by the UE on different antenna ports of a same cell.

Optionally, in a CoMP scenario, the eNB configures the UE to perform channel measurement according to a unified measurement period in each cell.

The eNB configures the time of measurement performed by the UE for each cell in the CoMP set to achieve the following effects:

1. Subframes for the measurement of different cells are alternate, that is, not a same subframe;

2. Subframes for the measurement of different cells are the same, but the measurement is performed based on the REs of different OFDM (orthogonal frequency division multiplexing) symbols of the same subframe;

3. Subframes for the measurement of different cells are the same, and the measurement is performed based on the REs of the same OFDM symbols of the same subframe;

4. The measurement may be configured to be performed in the subframe in which the PBCH (Primary Broadcast Channel, primary broadcast channel)/SCH (Synchronize Channel, synchronization channel) of the reference signal CRS or CSI-RS is;

5. It is configured that the REs occupied by the CRS on the data field are measured, and the REs occupied by the CRS on the control field are not measured; and 6. The measurement is performed in the location of the RE occupied by the CRS punctured in the neighboring cell.

The 6 methods above may be used separately, or some of them may be used in combination.

Optionally, in a CoMP scenario and a single-cell scenario, the eNB may use the following methods, but without being limited to the following methods, to configure the time of measurement performed by UE on different antenna ports of the same cell:

1. Configure the UE to perform, based on different subframes, measurement on different antenna ports. That is, the subframe for measurement varies between the antenna ports.

2. Configure the UE to perform, based on the REs of different OFDM symbols of a same subframe, measurement on different antenna ports in the same subframe.

3. Configure the UE to perform, based on the REs of a same OFDM symbol of a same subframe, measurement on different antenna ports in the same subframe.

Optionally, in a CoMP scenario, the eNB configures the UE to perform, based on the same density of measured REs, channel measurement for all cells or for all antenna ports of each cell. For example, the eNB may use the following method to configure the density of measured REs as a basis for the UE to perform channel measurement:

If different cells in a CoMP set use a same type of reference signal (CSI-RS or CRS), the channel measurement is performed according to the RE density configured for this type of reference signal. For example, if one CRS port occupies 8 REs, the channel measurement may be performed on only 6 of the REs. If different cells in a CoMP set use different reference signals (CSI-RS or CRS), the channel measurement may be performed according to the RE density configured for the CSI-RS. If the required accuracy of channel measurement is lowered, a density less than the CSI-RS density may be configured for performing channel measurement. For example, the channel measurement is based on a half of the CSI-RS density.

Optionally, the RE measurement density as a basis of channel measurement performed by the UE may be the same as the puncturing density of the reference signal of each cell.

In practical applications, the eNB may send a message of switching between the CoMP mode and the single-cell mode to the UE according to actual conditions, and the UE switches between the CoMP mode and the single-cell mode according to the received switching message. The eNB may configure the UE to use the same channel measurement mechanism no matter whether the CoMP mode is switched to the single-cell mode or the single-cell mode is switched to the CoMP mode; or, configure the UE to use the channel measurement mechanism in the CoMP mode when the single-cell mode is switched to the CoMP mode, and use the channel measurement mechanism under the single-cell mode when the CoMP mode is switched to the single-cell mode.

Optionally, in step 33, the eNB configures a puncturing period and a puncturing location for puncturing at a neighboring cell RE location corresponding to the reference signal according to a unified puncturing mechanism of the reference signal.

The puncturing mechanism may include the puncturing period and the puncturing location. The detailed method of configuring the puncturing mechanism may be: configuring the puncturing period and the puncturing locations for puncturing at the neighboring cell RE locations corresponding to the reference signal, where the puncturing locations are the neighboring cell RE locations corresponding to the RE locations occupied by the reference signal in the puncturing period, and the puncturing period is greater than the sending period of the reference signal;

or, configuring the puncturing period and the puncturing locations for puncturing at the neighboring cell RE locations corresponding to the reference signal, where the puncturing locations are the neighboring cell RE locations corresponding to a part of the RE locations occupied by the reference signal in the puncturing period;

or, configuring a puncturing period and puncturing locations for puncturing at neighboring cell RE locations corresponding to the reference signal, where the puncturing locations are neighboring cell RE locations corresponding to a part of the RE locations occupied by the reference signal in the puncturing period, and the puncturing period is greater than the sending period of the reference signal.

Figure 4:
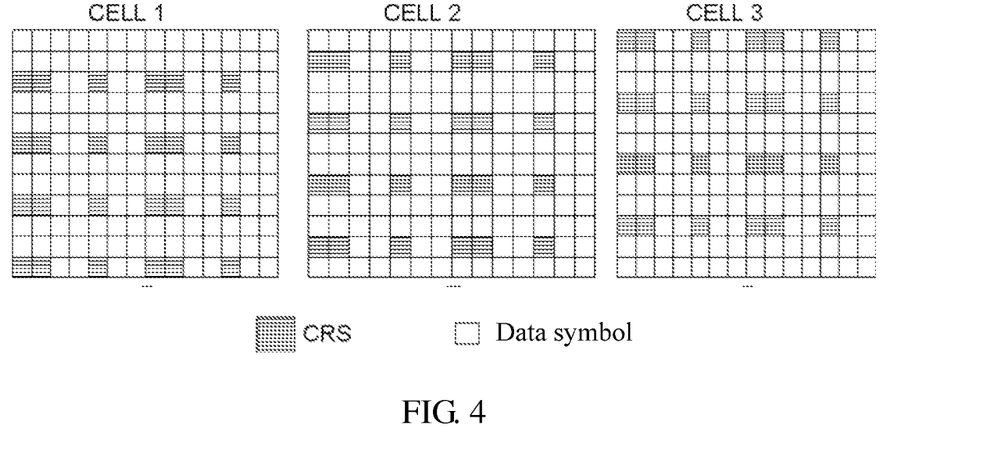
FIG. 4 is a schematic diagram of a CRS pattern configured by an eNB for 3 different cells in a CoMP set according to Embodiment 2 of the present invention.

For example, in a CoMP scenario, the reference signal may be a CSI-RS or CRS. If the CRS is configured to be use in 3 cells in a CoMP set, the CRS patterns configured by the eNodeB for 3 different cells may be as shown in FIG. 4. The CRS patterns of various cells are arranged alternately according to the frequency domain.

In a single-cell scenario, the eNB also configures a reference signal for measuring the channel state information for the cell according to the unified puncturing mechanism of the reference signal, where the reference signal may be a CSI-RS or CRS.

The unified puncturing mechanism of the reference signal will be detailed in embodiment 3.

Step 34: The eNB sends the UE a notification message that carries the channel measurement manner, and the UE performs channel estimation and channel measurement for each cell according to the notification message, and returns the channel state measurement information of each cell to the eNB.

The eNB sends the UE a notification message that carries the channel measurement manner. The channel measurement manner includes the configured information about the location of the to-be-measured reference signal, and optionally includes: a reference signal (CSI-RS or CRS) for channel measurement in each cell, a measurement period, density of REs as a basis of channel measurement, time of measurement performed by the UE in each cell, and time of measurement performed by the UE on different antenna ports of a same cell.

The UE performs channel estimation and channel measurement for each cell according to the notification message, and returns the channel state measurement information of each cell to the eNB.

In practical applications, the cell-ID of each cell may be used to identify at least one of the following items: the measurement period of the channel measurement performed by the user equipment, the information about the location of the to-be-measured reference signal, the time of measurement performed by the user equipment in each cell, the time of measurement performed by the user equipment on different antenna ports of the same cell, and the puncturing scheme of each cell.

The following uses an implicit notification of the puncturing scheme as an example (the implicit notification of other information mentioned above is similar). The CRS puncturing location varies between different cells.

Besides, the UE needs to measure the downlink channel of each cell in the CoMP measurement set. Therefore, the UE needs to be notified of the puncturing schemes of all cells in the measurement set. In this embodiment, the UE may be notified in an implicit mapping manner bound to a cell_id.

That is, the CRS puncturing scheme (including period and pattern) of each cell is directly related to the cell_id of the cell. The eNB notifies the UE1 of measuring the cell_id of all cells in the set, and the UE obtains a different reference signal location mapped to each different cell_id, and estimates the downlink channel of the cell in the corresponding location. Specifically, still as shown in FIG. 4, the CRS puncturing period is 5 ms, there are 5 possible types of puncturing schemes, and the cell_id_2 allocated by the network to cell 2 is 3. After receiving cell_id_2, UE1 may obtain the location of the subframe for the CRS puncturing of cell 2 through the following simple modulo operation:

cell_id_2 mod 5=1

Note that this notification mode requires that the CRSs of all cells in the same CoMP measurement set should be arranged alternately according to a frequency domain when the eNB allocates the cell_id.

In practical applications, two modes may be defined: a mechanism enabling mode and a mechanism disabling mode. The mechanism enabling mode refers to performing channel measurement based on the solution described in this embodiment. The mechanism disabling mode refers to performing channel measurement without using the solution described in the embodiment of the present invention and keeping the existing channel measurement solution unchanged. The eNB sends a message of switching between the foregoing two modes to the UE according to actual conditions, and the UE switches between the foregoing two modes according to the received switching message.

For multiple cells in the CoMP measurement set, the CRS or CSI-RS may be configured for multiple cells each, and the periods of and the density of the occupied REs of multiple reference signals used by the multiple cells may vary. Therefore, the UE needs to perform channel measurement for different reference signals in different processing manners in each cell, which increases much complexity of the UE performing channel measurement for each cell, and decreases the accuracy of channel measurement greatly. Moreover, it is inconvenient to use a unified mechanism to allocate the reference signal resources of all cells, and complexity of allocating the reference signal resources increases.

This embodiment provides a unified measurement mechanism for all cells, reducing the complexity of the UE performing channel measurement for each cell, and improving the accuracy of channel measurement. Therefore, the scheduling performed by the eNB between cells based on the channel measurement report is relatively fair.

Through the channel measurement based on the density of a part of REs occupied by the reference signal, the resource overhead of the downlink channel is reduced.

Embodiment 3

To further improve accuracy of channel estimation for the neighboring cell, all PDSCH (Physical Downlink Shared Channel, physical downlink shared channel) data on REs corresponding to a neighboring cell CRS is generally punctured within a CoMP measurement set. Puncturing here means that the corresponding RE location bears no signal. The purpose of puncturing is for reducing interference caused by the data in the reference signals of the neighboring cell, and enhancing accuracy of channel estimation.

In this embodiment, a puncturing period and puncturing locations may be configured for neighboring cell REs corresponding to the reference signal, where the puncturing locations are neighboring cell RE locations corresponding to the RE locations occupied by the reference signal in the puncturing period, and the puncturing period is greater than the sending period of the reference signal; or a puncturing period and puncturing locations are configured for neighboring cell REs corresponding to the reference signal, where the puncturing locations are neighboring cell RE locations corresponding to a part of the RE locations occupied by the reference signal in the puncturing period; or a puncturing period and puncturing locations are configured for neighboring cell REs corresponding to the reference signal, where the puncturing locations are neighboring cell RE locations corresponding to a part of the RE locations occupied by the reference signal in the puncturing period, and the puncturing period is greater than the sending period of the reference signal;

when multiple cells use one type of reference signal, a unified puncturing period of the multiple cells is an integer multiple of a sending period of this type of reference signal; and/or, a unified puncturing density of the multiple cells is less than or equal to the density of the REs occupied by this type of reference signal; and when multiple cells use multiple types of reference signals, a unified puncturing period of the multiple cells is an integer multiple of the sending period of a specified type of reference signal among the multiple types of reference signals; and/or, a unified puncturing density of the multiple cells is less than or equal to the density of the REs occupied by the specified type of reference signal among the multiple types of reference signals.

In this embodiment, to avoid too large overhead brought by the puncturing, for channel measurement, a unified puncturing period (such as 2 ms, 5 ms, and 10 ms) and a unified puncturing density are configured for puncturing the neighboring cell RE locations corresponding to the reference signals for all cells no matter whether the reference signal is CSI-RS or CRS. In each puncturing period, the data on only a part of REs is punctured, and the puncturing locations of different cells in a same CoMP measurement set are arranged alternately.

If one type of reference signal (CRS or CSI-RS) is configured for each cell in a CoMP set, the puncturing period may be configured as an integer multiple of the sending period (for example, one of the period, twice of the period, and so on) of the CRS or CSI-RS. If two types of reference signals (CSI-RS and CRS) are configured for each cell in a CoMP set, because the sending period of the CSI-RS is longer than that of the CRS, the puncturing period may be configured as an integer multiple of the sending period of the CSI-RS.

If one type of reference signal (CRS or CSI-RS) is configured for each cell in a CoMP set, the puncturing density is determined according to the situation of the REs occupied by this type of reference signal. If two types of reference signals (CSI-RS and CRS) are configured for each cell in a CoMP set, because the density of the REs occupied by the CSI-RS is lower than that occupied by the CRS, the puncturing density is determined according to the situation of the REs occupied by the CSI-RS. If the required accuracy of channel measurement is lowered, the density less than the CSI-RS density may be configured for puncturing. For example, the density of puncturing is a half of the density of REs occupied by the CSI-RS.

Generally, in practical applications, no puncturing is performed on a RE with a PBCH/SCH.

The eNB may use the following methods, but without being limited to the following methods, to configure the time of puncturing for each cell in the CoMP measurement set:

1. Configure the puncturing subframes of different cells to be alternate. That is, cells are not punctured on a same subframe;

2. Configure the puncturing subframe of each cell to be the same, with the puncturing being based on the REs of different OFDM symbols of the same subframe;

3. Configure the puncturing subframe of each cell to be the same, with the puncturing being based on the REs of a same OFDM symbol of the same subframe; and 4. Puncture the data on only the data field REs corresponding to the CRS, without puncturing the data on the control field REs corresponding to the CRS.

Figure 5A:
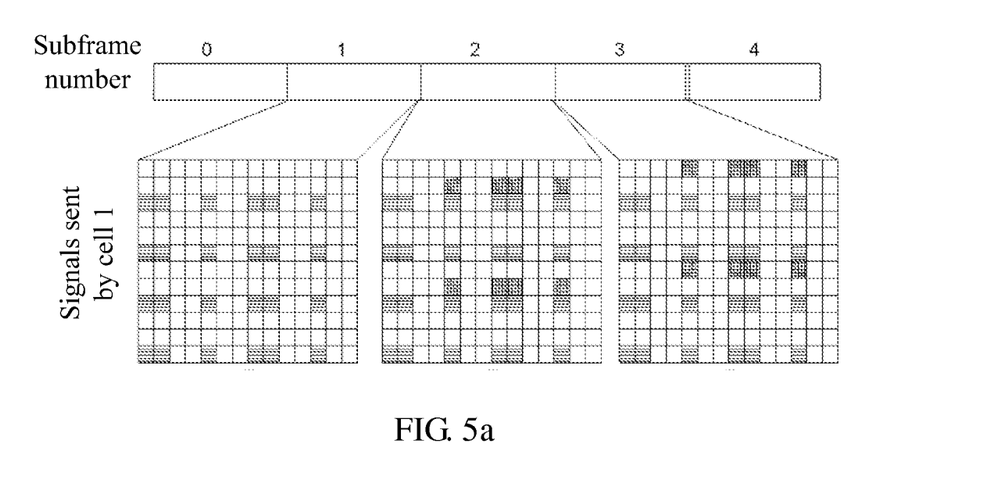
FIGS. 5a and 5b is a schematic diagram of a puncturing scheme of 3 cells for a CRS pattern of the 3 cells as shown in FIG. 3 according to Embodiment 3 of the present invention.
Figure 5B:
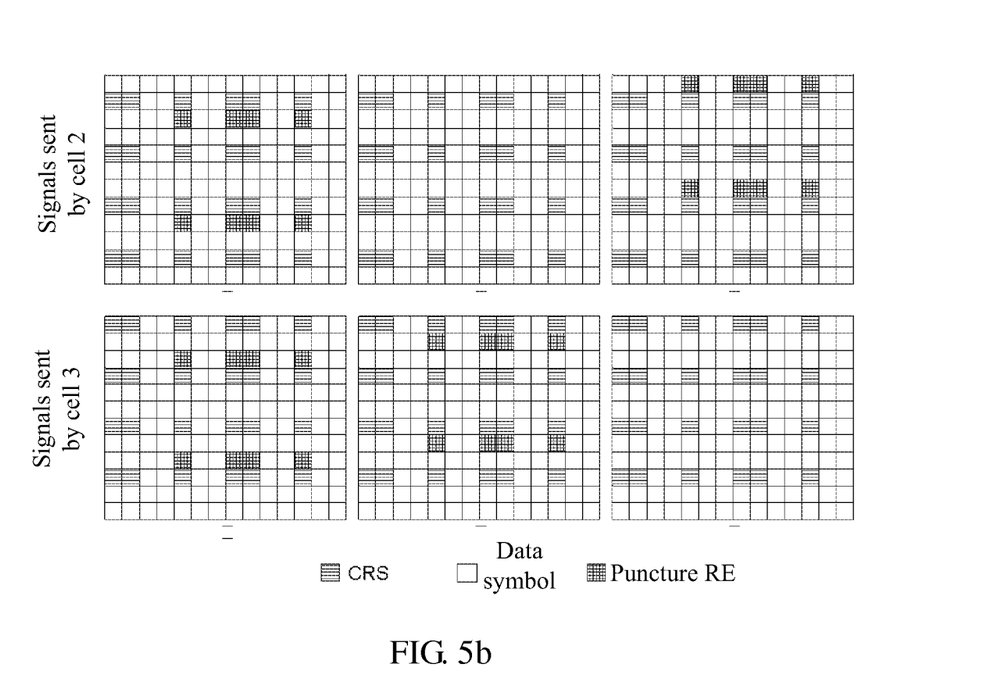

For example, if the CRS is configured for all cells in a CoMP set, the puncturing scheme of 3 cells shown in FIG. 5 is adopted for the CRS patterns of 3 cells shown in FIG. 4. In a 5 ms period, the puncturing for the data on the REs corresponding to the CRS of each cell occurs in only one subframe. The puncturing for the data on the REs corresponding to the CRS of cell 1 occurs in subframe 1 only, and partial puncturing manner is adopted. That is, cell 2 and cell 3 puncture the data of on the corresponding RE the CRS of cell 1 in subframe 1. If the RE corresponding to the CRS in subframe 1 is a control field, cell 2 and cell 3 do not puncture the RE. Among the CRSs corresponding to 3 frequencies, only the CRSs corresponding to two frequencies are punctured. Likewise, the data puncturing performed by cell 1 and cell 3 on the RE corresponding to the CRS of cell 2 occurs in subframe 2 only, and the data puncturing performed by cell 1 and cell 2 on the RE corresponding to the CRS of cell 3 occurs in subframe 3 only.

Figure 6A:
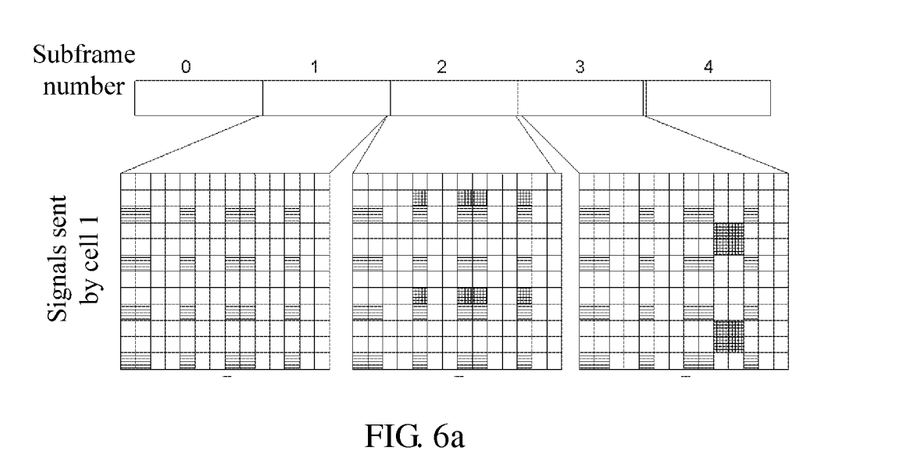
FIGS. 6a and 6b is a schematic diagram of a puncturing scheme of 3 cells when two types of reference signals (CSI-RS and CRS) are configured for each cell in a CoMP set according to Embodiment 3 of the present invention.
Figure 6B:
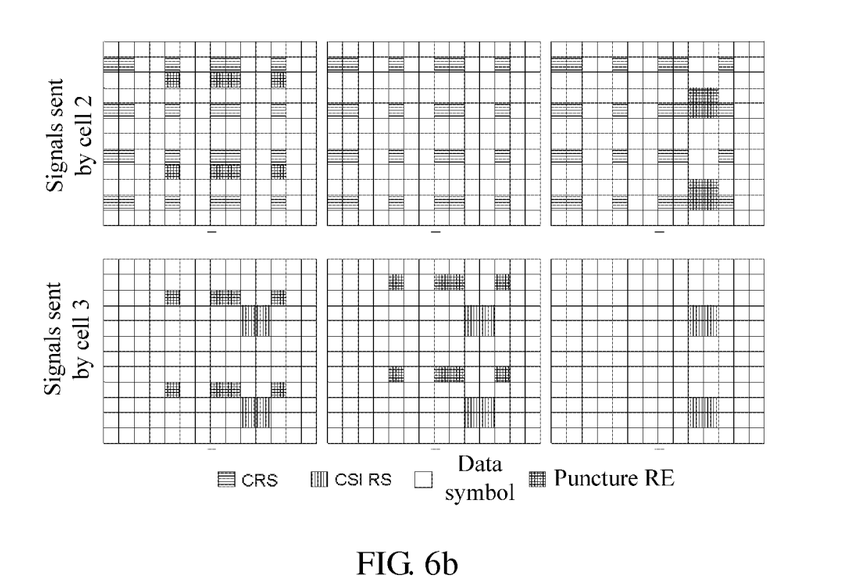

In another example, if two types of reference signals (CSI-RS and CRS) are configured for each cell in a CoMP set, the puncturing scheme of 3 cells shown in FIG. 6 may be adopted. The 3 cells uniformly determine the puncturing period and the puncturing density according to the CSI-RS sent by cell 3. In the puncturing scheme of 3 cells shown in FIG. 6, within a 5-ms period, the data puncturing on the RE corresponding to the CRS of cell 1 occurs in subframe 1 only, and a manner of partial puncturing is adopted. That is, cell 2 and cell 3 puncture the data of the CRS of cell 1 in subframe 1, where the data exists on the corresponding RE in subframe 1. If the RE is in subframe 1 corresponding to the CRS is a control field, cell 2 and cell 3 give up puncturing the RE. Among the CRSs corresponding to 3 frequencies, only the CRSs corresponding to two frequencies are punctured. Likewise, the data puncturing performed by cell 1 and cell 3 on the RE corresponding to the CRS of cell 2 occurs in subframe 2 only, and the data puncturing performed by cell 1 and cell 2 on the RE corresponding to the CSI-RS of cell 3 occurs in subframe 3 only. Because the density of the CSI-RS is small, cell 1 and cell 2 puncture all REs corresponding to the CSI RS of cell 3 in subframe 3.

Persons of ordinary skill in the art can understand that all or part of the procedures in the method embodiments above may be implemented by a program instructing relevant hardware. The program may be stored in a computer readable storage medium. When the program runs, the procedures in the method embodiment above may be executed. The storage medium may be a magnetic disk, an optical disk, a read-only memory (Read-Only Memory, ROM), or a random access memory (Random Access Memory, RAM).

This embodiment provides a unified puncturing mechanism for all cells, which reduces the complexity of the UE performing channel measurement for all cells, facilitates use of a unified mechanism for allocating reference signal resources to each cell, and improves the accuracy of allocating the reference signal resources. Through partial puncturing for the reference signals, the resource overhead of the downlink channel is reduced.

Embodiment 3

Figure 7:
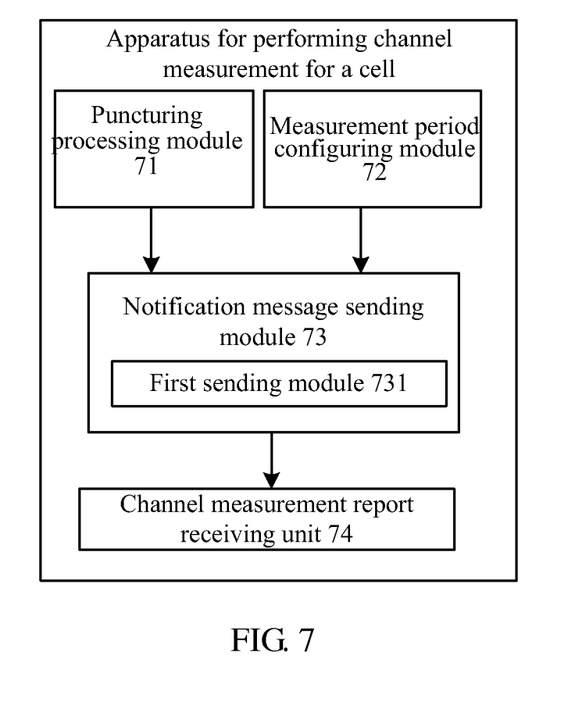
FIG. 7 is a schematic structural diagram of an apparatus for performing channel measurement for a cell according to an embodiment of the present invention.

This embodiment provides an apparatus for performing channel measurement for a cell. The apparatus, the specific structure of which is as shown in FIG. 7, includes:

an information sending module 73, configured to send information about a location of a to-be-measured reference signal to a user equipment, where the location of the to-be-measured reference signal is a part of a location occupied by a reference signal of the cell; and a channel measurement report receiving module 74, configured to receive a channel measurement report of the cell, where the channel measurement report is sent by the user equipment and is obtained after the user equipment performs channel measurement for the cell according to the information about the location of the to-be-measured reference signal.

The apparatus may further include:

a puncturing processing module 71, configured to: set a puncturing period and puncturing locations for puncturing at neighboring cell RE locations corresponding to the reference signals, where the puncturing locations are neighboring cell RE locations corresponding to the RE locations occupied by the reference signal in the puncturing period, and the puncturing period is greater than a sending period of the reference signal; or set a puncturing period and puncturing locations for puncturing at neighboring cell RE locations corresponding to the reference signal, where the puncturing locations are neighboring cell RE locations corresponding to a part of the RE locations occupied by the reference signal in the puncturing period; or set a puncturing period and puncturing locations for puncturing at neighboring cell RE locations corresponding to the reference signal, where the puncturing locations are neighboring cell RE locations corresponding to a part of the RE locations occupied by the reference signal in the puncturing period, and the puncturing period is greater than the sending period of the reference signal, where when multiple cells use one type of reference signal, the unified puncturing period of the multiple cells is an integer multiple of the sending period of this type of reference signal; and/or the unified puncturing density of the multiple cells is less than or equal to the density of the REs occupied by this type of reference signal;

when multiple cells use multiple types of reference signals, the unified puncturing period of the multiple cells is an integer multiple of the sending period of a specified type of reference signal among the multiple types of reference signals; and/or, a unified puncturing density of the multiple cells is less than or equal to the density of the REs occupied by the specified type of reference signal among the multiple types of reference signals; and a location information configuring module 72, configured to set a measurement period of the user equipment performing channel measurement, and RE locations occupied by the reference signal in the measurement period, where the measurement period is greater than the sending period of the reference signal; or set the measurement period of the user equipment performing channel measurement, and a part of the RE locations occupied by the reference signal in the measurement period; or set the measurement period of the user equipment performing channel measurement, and a part of the RE locations occupied by the reference signal in the measurement period, where the measurement period is greater than the sending period of the reference signal.

The measurement period may be an integer multiple of the sending period of the reference signal.

When multiple cells use one type of reference signal, the unified measurement period of the multiple cells is an integer multiple of the sending period of this type of reference signal; and/or, the density of the REs occupied by the to-be-measured reference signal in the unified measurement period of the multiple cells is less than or equal to the density of the REs occupied by this type of reference signal.

When multiple cells are configured to use multiple types of reference signals, the unified measurement period of the multiple cells is an integer multiple of the sending period of a specified type of reference signal among the multiple types of reference signals; and/or the density of the REs occupied by the reference signals to be measured in the unified measurement period of the multiple cells is less than or equal to the density of the REs occupied by the specified type of reference signal among the multiple types of reference signals.

The information sending module includes:

a first sending module, configured to send at least one of the following items to the user equipment: the time of measurement performed by the user equipment in each cell, and the time of measurement performed by the user equipment on different antenna ports of the same cell, where an identifier of each cell is used to identify at least one of the following items: the measurement period of the channel measurement performed by the user equipment, the information about the location of the to-be-measured reference signal, the time of measurement performed by the user equipment in each cell, and the time of measurement performed by the user equipment on different antenna ports of a same cell.

The apparatus for performing channel measurement for the cell may be an eNB.

Figure 8:
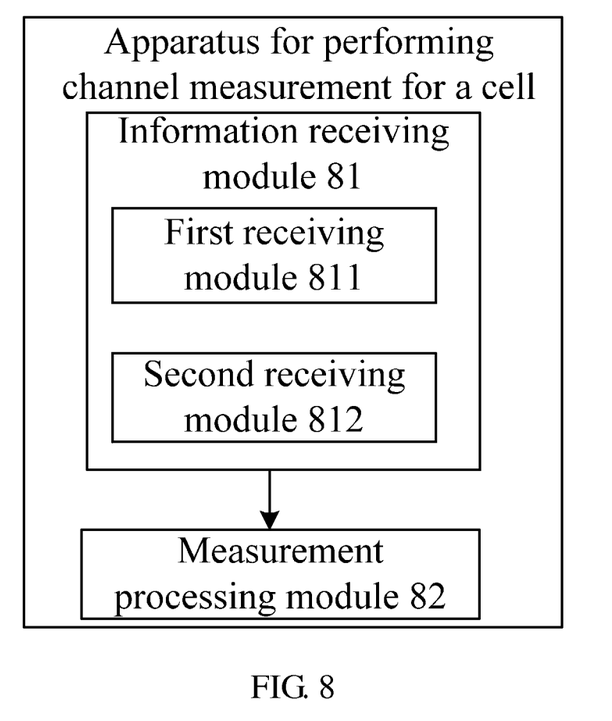
FIG. 8 is a schematic structural diagram of another apparatus for performing channel measurement for a cell according to an embodiment of the present invention.

This embodiment further provides another apparatus for performing channel measurement for a cell. The apparatus, the specific implementation structure of which is as shown in FIG. 8, includes:

an information receiving module 81, configured to receive information about a location of a to-be-measured reference signal of the cell, where the information about the location is sent by a network side, and the location of the to-be-measured reference signal is a part of a location occupied by a reference signal of the cell; and a measurement processing module 82, configured to perform channel measurement for the cell according to the information about the location of the to-be-measured reference signal, and return a channel measurement report to the network side.

The information receiving module 81 includes:

a first receiving module 811, configured to receive the measurement period of the user equipment performing channel measurement, and the RE locations occupied by the reference signal in the measurement period, where the measurement period and the RE locations are sent by the network side, and the measurement period is greater than the sending period of the reference signal; or the measurement period of the user equipment performing channel measurement, and a part of the RE locations occupied by the reference signal in the measurement period; or the measurement period of the user equipment performing channel measurement, and a part of RE locations occupied by the reference signal in the measurement period, where the measurement period is greater than the sending period of the reference signal; and a second receiving module 812, configured to receive at least one of the following items sent by the network side: the time of measurement performed by the user equipment in each cell, and the time of measurement performed by the user equipment on different antenna ports of the same cell, where an identifier of each cell is used to identify at least one of the following items: the measurement period of the channel measurement performed by the user equipment, the information about the location of the to-be-measured reference signal, the time of measurement performed by the user equipment in each cell, and the time of measurement performed by the user equipment on different antenna ports of the same cell.

The other apparatus for performing channel measurement for the cell may be a user equipment.

In conclusion, the embodiments of the present invention provide a unified measurement mechanism and a unified puncturing mechanism for all cells, which reduce the complexity of the UE performing channel measurement for all cells, and increase the accuracy of channel measurement. Therefore, the scheduling performed by the eNB between cells based on the channel measurement report is relatively fair. Moreover, it is convenient to use a unified mechanism to allocate the reference signal resources of all cells, and increase complexity of allocating the reference signal resources.

In the embodiments of the present invention, partial puncturing is performed for the reference signal, and channel measurement is performed based on the density of a part of REs occupied by the reference signals, which reduces the resource overhead of the downlink channel.

The above descriptions are merely exemplary embodiments of the present invention, but not intended to limit the scope of the present invention. Any modifications, variations or replacement that can be easily figured out by those skilled in the art shall fall within the scope of the present invention. Therefore, the protection scope of the present invention is subject to the protection scope of the appended claims.

What is claimed is:

1. A method for performing channel measurement for a cell, the method comprising:
   sending information about a location of a to-be-measured reference signal to a user equipment, wherein the location of the to-be-measured reference signal is a part of a location occupied by a reference signal of the cell; and
   receiving a channel measurement report of the cell, wherein the channel measurement report is sent by the user equipment and is obtained after the user equipment performs channel measurement for the cell according to the information about the location of the to-be-measured reference signal,
   wherein the information about the location of the to-be-measured reference signal comprises a measurement period of the user equipment performing channel measurement and at least some of resource element locations occupied by the to-be-measured reference signal in the measurement period, and
   wherein the measurement period is greater than a sending period of the reference signal.

2. The method according to claim 1, wherein the measurement period is an integer multiple of the sending period of the reference signal.

3. The method according to claim 1, wherein:
   when multiple cells use one type of reference signal, a unified measurement period of the multiple cells is an integer multiple of the sending period of this type of reference signal; or, a density of the resource elements occupied by the to-be-measured reference signal in the unified measurement period of the multiple cells is less than or equal to a density of the resource elements occupied by this type of reference signal; and when multiple cells use multiple types of reference signals, the unified measurement period of the multiple cells is an integer multiple of the sending period of a specified type of reference signal among the multiple types of reference signals; or, the density of the resource elements occupied by to-be-measured reference signals of the multiple cells in the unified measurement period of the multiple cells is less than or equal to the density of the resource elements occupied by the specified type of reference signal among the multiple types of reference signals.

4. The method according to claim 1, further comprising:

configuring a puncturing period and puncturing locations for puncturing at neighboring cell resource element locations corresponding to the reference signal, wherein the puncturing locations are neighboring cell resource element locations corresponding to resource element locations occupied by the reference signal in the puncturing period, and the puncturing period is greater than the sending period of the reference signal;

or configuring a puncturing period and puncturing locations for puncturing at neighboring cell resource element locations corresponding to the reference signal, wherein the puncturing locations are neighboring cell resource element locations corresponding to a part of the resource element locations occupied by the reference signal in the puncturing period;

or configuring a puncturing period and puncturing locations for puncturing at neighboring cell resource elements corresponding to the reference signal, wherein the puncturing locations are neighboring cell resource element locations corresponding to a part of the resource element locations occupied by the reference signal in the puncturing period, and the puncturing period is greater than the sending period of the reference signal.

5. The method according to claim 1, wherein:

when multiple cells use one type of reference signal, a unified puncturing period of the multiple cells is an integer multiple of the sending period of this type of reference signal; or, a unified puncturing density of the multiple cells is less than or equal to the density of the resource elements occupied by this type of reference signal; and when multiple cells use multiple types of reference signals, a unified puncturing period of the multiple cells is an integer multiple of the sending period of a specified type of reference signal among the multiple types of reference signals; or, a unified puncturing density of the multiple cells is less than or equal to the density of the resource elements occupied by the specified type of reference signal among the multiple types of reference signals.

6. The method according to claim 1, further comprising sending an item to the user equipment, the item being selected from a group consisting of time of measurement performed by the user equipment in each cell, and time of measurement performed by the user equipment on different antenna ports of the same cell.

7. The method according to claim 6, wherein an identifier of each cell is used to identify at least one of the following items: measurement period of the measurement performed by the user equipment, the information about the location of the to-be-measured reference signal, the time of measurement performed by the user equipment in each cell, and the time of measurement performed by the user equipment on different antenna ports of a same cell.

8. An apparatus for performing channel measurement for a cell, the apparatus comprising:

an information sending module, configured to send information about a location of a to-be-measured reference signal to a user equipment, wherein the location of the to-be-measured reference signal is a part of a location occupied by a reference signal of the cell; and a channel measurement report receiving module, configured to receive a channel measurement report of the cell, wherein the channel measurement report is sent by the user equipment and is received after the user equipment performs channel measurement for the cell according to the information about the location of the to-be-measured reference signal;

a location information configuring module, configured to set a measurement period of the user equipment performing channel measurement, and resource element (RE) locations occupied by the reference signal in the measurement period, wherein the measurement period is greater than a sending period of the reference signal; or to set the measurement period of the user equipment performing channel measurement, and the location of a part of the REs occupied by the reference signal in the measurement period; or to set the measurement period of the user equipment performing channel measurement, and the location of a part of REs occupied by the reference signal in the measurement period, wherein the measurement period is greater than the sending period of the reference signal.

9. The apparatus according to claim 8, further comprising:

a puncturing processing module, configured to set a puncturing period and puncturing locations for puncturing at neighboring cell resource element locations corresponding to the reference signal, wherein the puncturing locations are neighboring cell resource element locations corresponding to the resource element locations occupied by the reference signal in the puncturing period, and the puncturing period is greater than the sending period of the reference signal; or to set the puncturing period and puncturing locations for puncturing at neighboring cell resource element locations corresponding to the reference signal, wherein the puncturing locations are neighboring cell resource element locations corresponding to a part of the resource element locations occupied by the reference signal in the puncturing period; or to set the puncturing period and puncturing locations for puncturing at neighboring cell resource element locations corresponding to the reference signal, wherein the puncturing locations are neighboring cell resource element locations corresponding to a part of the resource element locations occupied by the reference signal in the puncturing period, and the puncturing period is greater than the sending period of the reference signal.

10. The apparatus according to claim 8, wherein the information sending module comprises a first sending module, configured to send to the user equipment at least one of a first time of measurement performed by the user equipment in each cell, and a second time of measurement performed by the user equipment on different antenna ports of the same cell, wherein an identifier of each cell is used to identify at least one of the measurement period of the channel measurement performed by the user equipment, the information about the location of the to-be-measured reference signal, the first time of measurement performed by the user equipment in each cell, and the second time of measurement performed by the user equipment on different antenna ports of the same cell.

11. The apparatus according to claim 8, wherein the location information configuring module is configured to set the measurement period of the user equipment performing channel measurement, and resource element locations occupied by the reference signal in the measurement period, and wherein the measurement period is greater than the sending period of the reference signal.

12. The apparatus according to claim 8, wherein the location information configuring module is configured to set the measurement period of the user equipment performing channel measurements, and the location of the part of the REs occupied by the reference signal in the measurement period.

13. The apparatus according to claim 8, wherein the location information configuring module is configured to set the measurement period of the user equipment performing channel measurements, and the location of the part of REs occupied by the reference signal in the measurement period, and wherein the measurement period is greater than the sending period of the reference signal.

* * * * *